(12) United States Patent
Irons (10) Patent No.: US 12,484,689 B2
(45) Date of Patent: *Dec. 2, 2025

(54) FOOD HOLDER

(71) Applicant: Montrell Irons, St. Louis, MO (US)

(72) Inventor: Montrell Irons, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/630,811

(22) Filed: Apr. 9, 2024

(65) Prior Publication Data

US 2024/0268542 A1 Aug. 15, 2024

Related U.S. Application Data

(63) Continuation of application No. 17/128,591, filed on Dec. 21, 2020, now Pat. No. 11,950,686.

(51) Int. Cl.
*A45F 5/00* (2006.01)
*A41D 3/00* (2006.01)
*A45F 3/00* (2006.01)

(52) U.S. Cl.
CPC ............... *A45F 5/00* (2013.01); *A41D 3/005* (2013.01); *A41D 2200/20* (2013.01); *A41D 2400/48* (2013.01); *A45F 2003/002* (2013.01); *A45F 2005/006* (2013.01)

(58) Field of Classification Search
CPC ............ A41D 2200/20; A41D 2400/48; A41D 3/005; A45F 2003/002; A45F 2005/006; A45F 5/00; A47G 2023/0675; A47G 23/06

USPC .............. 224/181, 578, 623, 638; 383/72–76
See application file for complete search history.

(56) References Cited

U.S. PATENT DOCUMENTS

| 6,092,661 | A | 7/2000 | Mogil |
| D432,785 | S | 10/2000 | Berg et al. |
| 6,401,993 | B1 | 6/2002 | Andrino |
| 11,950,686 | B2* | 4/2024 | Irons ..................... A41D 3/005 |
| 2013/0247271 | A1 | 9/2013 | Bowen et al. |
| 2015/0020215 | A1 | 1/2015 | Worth |
| 2019/0289936 | A1* | 9/2019 | Hourani ............... A41D 27/207 |

FOREIGN PATENT DOCUMENTS

FR 2819700 4/2024

* cited by examiner

*Primary Examiner* — Nathan J Newhouse
*Assistant Examiner* — Matthew T Theis
(74) *Attorney, Agent, or Firm* — Law Office of Mark Brown, LLC

(57) ABSTRACT

The present disclosure relates generally to food holders and in particular to a food holder for holding food and/or food containers. The food holder may include a receptacle. The receptacle may include an insulated inner surface for keeping contents at a desired temperature. Food holder may further include an expanded form or a collapsed form for positioning within an internal compartment of a garment. In addition, food holder may include a strap attached to said receptacle. Advantageously, the food holder may be constructed to hang from a user's neck for hands free use and ease of access to contents within the food container.

1 Claim, 6 Drawing Sheets

FOOD HOLDER

CROSS-REFERENCE TO THE RELATED APPLICATION

This application is a Continuation of U.S. patent application Ser. No. 17/128,591, filed Dec. 21, 2020, which is incorporated by reference.

BACKGROUND OF THE INVENTION

1. Field of the Invention

The present disclosure relates to a food holder and in particular to a food holder for holding food or food containers that is constructed to hang from a user's neck for hands free use and ease of access to contents.

Description of the Related Art

A hood often refers to a covering for the head and neck with an opening for the face. Individuals commonly use hoods for protection from various weather conditions, such as wind, snow or rain.

Hoods often form part of a garment, such as a coat or sweatshirt. However, hooded garments are often limiting in that they only allow for comfortable wear in the traditional manner, where the hood is positioned posterior to the user. Most hooded garments are not designed for and would not functionally or structurally accommodate the positioning of the hood in a position anterior to the user.

Similarly, the prior art does not teach or suggest the ability to wear a hooded garment wherein the hood may function as a pouch for holding certain items, such as food, in front of the user. In this regard the present invention satisfies this long-felt need.

SUMMARY

The present disclosure relates generally to food holders and in particular to a food holder for holding food or food containers. Advantageously, the device is constructed for hands free use and ease of access to contents. Moreover, the device solves other various problems associated with conventional devices for holding food.

An aspect of the present disclosure is a food holder including a receptacle having an outer surface, an inner surface, a bottom surface, and a top edge defining an opening. A side wall of the inner surface may form a cavity extending downward to a closed floor, wherein a diameter of the opening is larger than the diameter of the bottom surface.

In addition, food holder may include a strap attached to the receptacle. The strap may be attached to the outer surface of the receptacle via a hook and loop fastener, a zipper or snaps. The length of the strap may be between about thirty-six inches and about seventy-two inches. Moreover, the strap may extend around the outer surface and attach to between about 50% and about 70% of the circumference of the outer surface.

In addition, the strap may include a drawstring passing through a channel of the strap. The drawstring may include toggles configured to adjust the length of the strap.

The inner surface may be made of an insulating material to keep the contents, such as popcorn, of a food container at their desired temperate. The cavity of the inner surface may be adapted to hold a popcorn bucket of various sizes, such as a 24 oz. bucket, a 32 oz. bucket, a 46 oz. bucket, a 64 oz. bucket, an 85 oz. bucket, a 130 oz. bucket, and a 170 oz. bucket.

The food holder may further include a lid. The lid may be fastened to the top edge of the receptacle via a zipper. The lid may further include a handle for lateral movement.

Another aspect of the present disclosure is a garment for use with the food holder. The garment may include a front surface and a back surface. A fastener may be interposed longitudinally between the top end and bottom end of the front surface for opening or closing a slit. The slit may form an internal compartment defined by an interior wall. The internal compartment may retain the food holder, which can be collapsed for positioning within the internal compartment or expanded when removed from the internal compartment.

The garment may further include a hood. The hood may be retrieved the back surface of the garment. In certain embodiments, the hood includes an interior section having liquid conduit for dispensing one or more beverages. Liquid conduit may include an adapter for connecting to one or more beverage containers and a mouthpiece through which a user may consume the one or more beverages.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

DETAILED DESCRIPTION

The present disclosure relates generally to food holders and in particular to a food holder for holding food containers that is constructed to hang from a user's neck. Advantageously, the food holder (also referred to as a popcorn bucket hoodie) facilitates hands free use and ease of access to contents.

Figure 1:
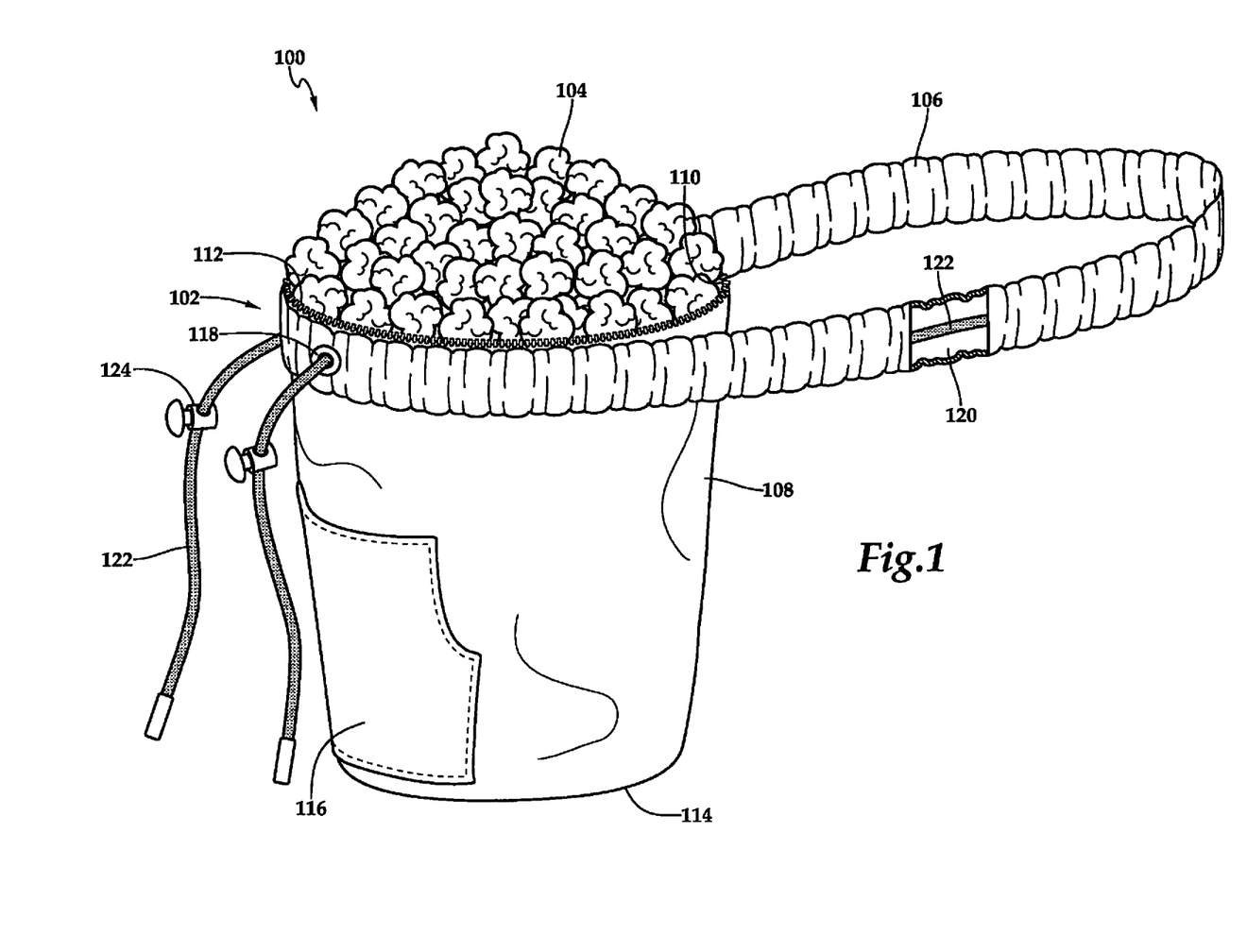
FIG. 1 is a perspective view of a food holder.

Referring now to the drawings, FIG. 1 illustrates a perspective view a food holder 100. As shown, food holder 100 includes a receptacle 102 adapted to receive and hold food and/or a food container 104, such as a popcorn bucket. It is further contemplated that receptacle 102 can serve the dual purpose of holding other items when not holding the food or food container 104.

Food holder 100 may further include a strap 106 attached to receptacle 102. Strap 106 may facilitate hanging food holder 100 from a user's neck or other part of the body. In addition, food holder 100 may be movable between a collapsed form and an expanded form, as detailed below.

As shown in FIG. 1, receptacle 102 includes an outer surface 108, inner surface 110, top edge 112, and bottom surface 114. Receptacle 102 may have a height in a range between about five and about twelve inches and preferably between about six and about nine inches. In one embodiment, the holder may have an approximate height of eight inches. As shown, receptacle 102 is configured as substantially conical shaped with an open top and a flat bottom, however, other shapes are contemplated.

Receptacle 102 may be constructed from multiple layers of various materials. For example, one or more layers of receptacle 102 may include fabrics, foams, films, fibers, and plastics.

Outer surface 108 of receptacle 102 may be formed of a knit fabric, a woven fabric or a non-woven fabric. The material for the fabric may include fibers of a synthetic material (e.g., windbreaker material) such as nylon, polypropylene, and polyester. Alternatively, the material for the outer surface can be of a natural material (e.g., sweatshirt material) such as cotton, silk or cellulosic materials, or blends of such materials, including blends also containing synthetic fibers or filaments. In addition, the fabric can be waterproof or treated with water repellant.

As shown in FIG. 1, outer surface 108 may further includes a pocket 116/pocket 116 may be positioned on the front of food holder 100 and attached to outer surface 108 through any suitable attachment means.

Pocket 116 may include an opening on each side. The opening of pocket 116 may range between about two inches and about six inches, and preferably be between about four inches and five inches. Openings may have a scooped shape such that the bottom of pocket 116 is longer than the top.

Pocket 116 may be sized and adapted to conveniently store and carry small items, such as keys, tickets, money, cell phones, and/or credit cards. In certain embodiments, pocket 116 may further open and close through use of one or more fasteners, such as snaps, buttons, zippers, and elastic bands.

Figure 2A:
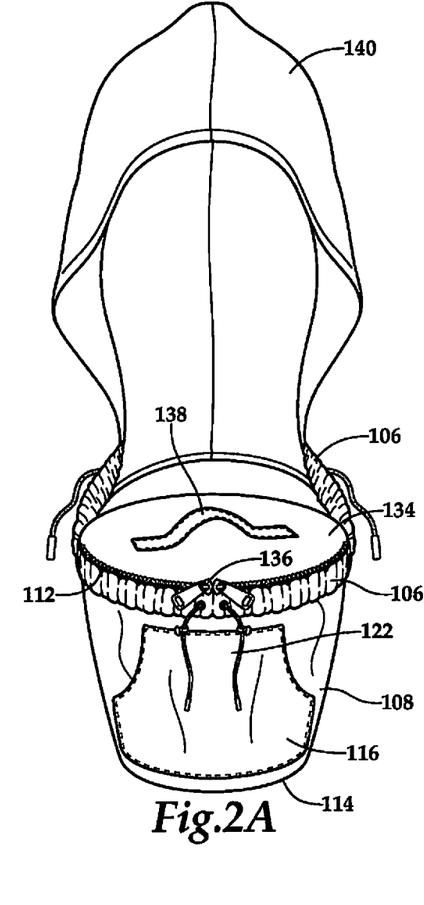
FIG. 2A illustrates a front perspective view of the food holder of FIG. 1 including a lid and a hood.
Figure 2B:
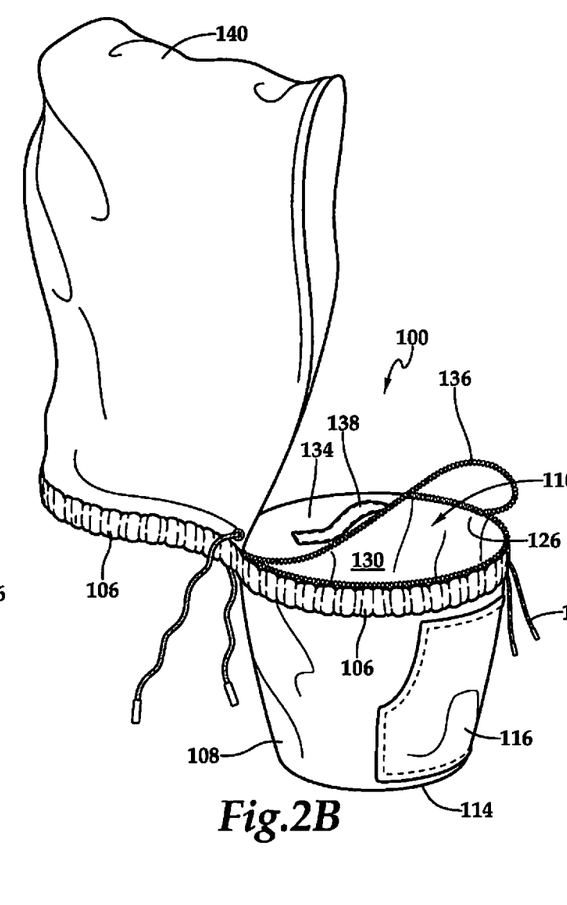
FIG. 2B illustrates a side perspective view of the food holder of FIG. 1 including a lid and a hood.
Figure 2C:
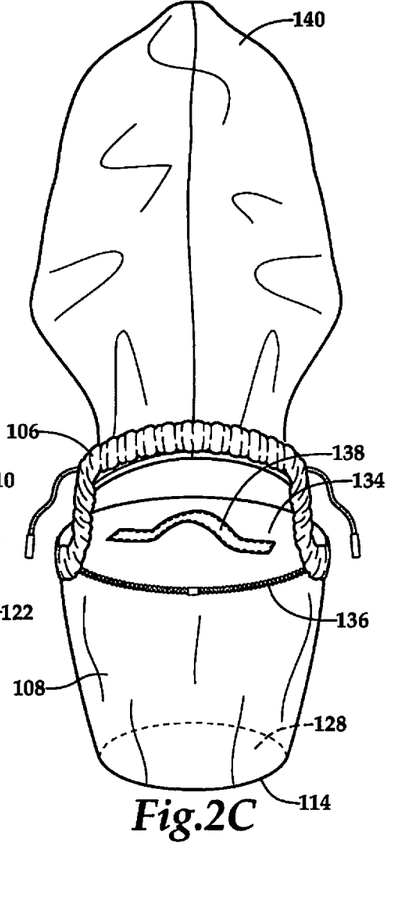
FIG. 2C illustrates a back perspective view of the food holder of FIG. 1 including a lid and a hood.

As further shown in FIG. 1, strap 106 may be attached to receptacle 102. Strap 106 may be attached to outer surface 108 near the top edge 112 of receptacle 102. As shown in FIGS. 2A-2C, strap 106 may be positioned around a hood 140 that a user is wearing. In certain embodiments, strap 106 may be removably attached to hood 140 via one or more fasteners, such as snaps, buttons, and a zipper.

A portion of strap 106 may attach to an area of the outer surface 108 distal from a user when hung around the user's neck. In particular, a portion of strap 106 may attach between about 40% and 80% of the circumference of outer surface 108, preferably between about 50% and about 70% of the circumference of outer surface 108, and even more preferably between about 55% and about 65% of the circumference of outer surface 108. A portion of strap 106 that is not attached to the outer surface 108 may extend in a lateral direction such that a proximal portion of the receptacle 102 may rest against the user's body.

Strap 106 may be sewn onto outer surface 108 using a stitch that is secure, such as a zigzag stitch. While described as stitched, strap 106 and outer surface 108 may be bound by other means, including adhesives, mechanical connections-such as hooks and snaps-or any other suitable attachment means.

The length of strap 106 may range from about thirty-six inches to about seventy two inches, and preferably be about forty inches to about sixty inches. In one embodiment, the length of the strap 106 is approximately fifty-eight inches. The width of strap 106 may range from about one quarter inch to about three inches, and preferably be about one-half inch to about two inches. In one embodiment, the width of the strap 106 is approximately three quarters of an inch.

Strap 106 may further include apertures 118 that lead to a channel 120. Apertures 118 may include stitching or may be surrounded by a small metal ring for reinforcement and to prevent tears in the surrounding materials. Channel 120 is sized and shaped so that a cord or a drawstring 122 can fit inside and slide freely within strap 106.

Drawstring 122 may be made of an elastic material, although other materials are contemplated such as leather, vinyl substitute leather, nylon, velvet, polyurethane fabric, polypropylene fabric, cotton, wool, and silk. The length of drawstring 122 may range between about twenty-five inches and about fifty inches, and preferably have a length between about thirty inches and forty inches.

As shown in FIG. 1, toggles 124 may be used to maintain a position of drawstring 122, so as to adjust the length of the strap 106 for a more custom fit to the user of food holder 100. Toggles 124 may include an adjustment mechanism and may temporarily lock the length of strap 106 until more adjustments are needed. Examples of mechanisms that may be used as toggles 124 include, but are not limited to, a cord clamp, a cord cinch, a cord clinch, a cord stopper, a double-holed locking toggle, and a cord lock.

Referring back to receptacle 102 of FIG. 1 and FIGS. 2A-2C, inner surface 110 may be sized and shaped to receive food or food container 104. A sidewall 126 and a substantially closed floor 128 of inner surface 110 may form a cavity 130 extending downward from an opening 132 of receptacle 102.

Cavity 130 may be adapted to hold various sizes and shapes of a popcorn bucket, such as a round or rectangular 24 oz. bucket, a 32 oz. bucket, a 46 oz. bucket, a 64 oz. bucket, an 85 oz. bucket, a 130 oz. bucket, or a 170 oz. bucket.

Cavity 130 may hold a popcorn bucket having a height ranging from about five inches to about ten inches, and preferably having a height between about six inches to about eight inches. Also, cavity 130 may hold a popcorn bucket having a top diameter ranging from about 3 inches to about nine inches, and preferably having a top diameter between about four inches and seven inches. Furthermore, cavity 130 may hold a popcorn bucket having a bottom diameter ranging from about two inches to about seven inches, and preferably having a bottom diameter between about three inches and about six inches.

Sidewall 126 and closed floor 128 of receptacle 102 may be fabricated from or include a reflective and/or an insulating material such as, for example, a rubberized material, neoprene or foam. It should be appreciated that the insulating material helps reduce heat transfer, thereby keeping the contents at their desired temperature for a longer period of time. In addition, the insulating material may hold a food container more securely, as compared to non-insulated material, to prevent the contents from inadvertently falling out of receptacle 102.

As mentioned above, receptacle 102 may further include a top edge 112 defining opening 132 and a flat bottom surface 114. As shown, a diameter of opening 132 may be larger than a diameter of the bottom surface 114, however, other configurations are contemplated. While top edge 112 is shown to have a coupling element, other configurations are contemplated. For example, top edge 112 may be formed of a material, such as the material of outer surface 108, with no coupling elements.

The diameter of opening 132 may range from about three to about ten inches, and preferably be about four inches to about eight inches. In certain embodiments, the diameter of the opening 132 is approximately seven inches.

Opposite opening 132 is a flat bottom surface 114. The diameter of bottom surface may range from about two to about eight inches, and preferably be about three inches to about seven inches. In certain embodiments, the diameter of the bottom surface is approximately six inches.

As shown in FIGS. 2A-2C, a lid 134 may be attached to top edge 112 to cover opening 132 and seal contents within cavity 130. Top edge 112 may include reclosable fasteners, such as a zipper 136, so that lid 134 can be opened and closed selectively and repeatedly. Other suitable reclosable fasteners can be attached to top edge 112 and lid 134, such as snaps, buttons, and hook and loop fasteners. In certain embodiments, a portion of lid 134 is permanently attached (e. g., stitched) to a portion of top edge 112 and the remaining portions of each component are removably fastened to one another.

Lid 134 may further include a handle 138. Handle 138 may be centrally positioned and fixedly attached to lid 134. Lid 134 and handle 138 may be made of a material similar to other components of food holder 100. For example, a top surface of lid 134 may be made of a fabric similar to outer surface 108 and a bottom surface of lid 132 may be made of an insulating material similar to inner surface 110 of receptacle 102.

FIGS. 3A-3H illustrate a garment 200 including food holder 100 of FIG. 1. Although depicted as a hooded sweatshirt, it is contemplated that garment 200 may be any item of clothing, including, for example, t-shirts, sweatshirts, sweaters, overalls, costumes, and coats.

Figures 3A, 3B:
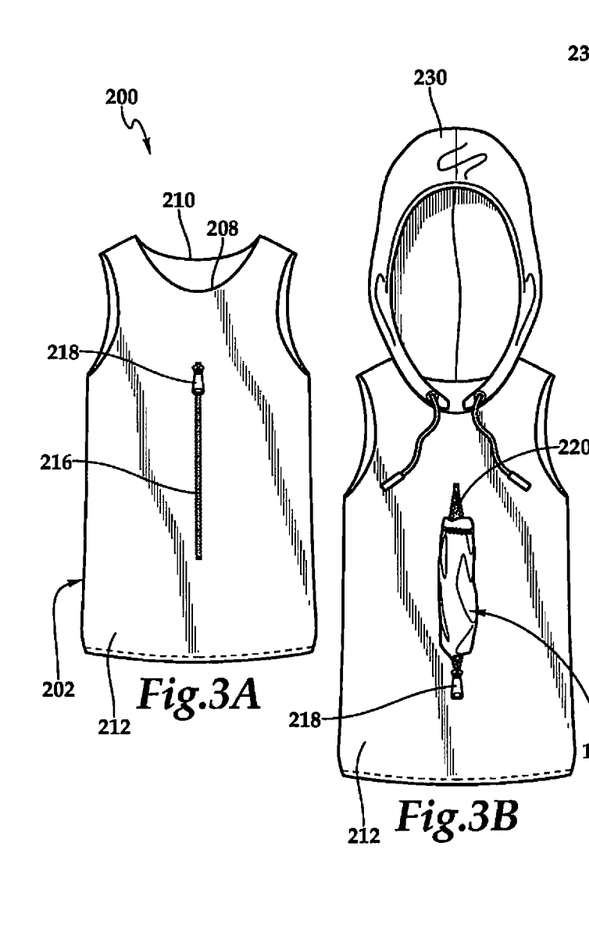
FIG. 3A illustrate a front surface of a garment including a slit and fastner.
FIG. 3B illustrate the food holder of FIG. 1 in a collapsed form for positioning within the garment of FIG. 3A.

Garment 200 may include a body portion 202 including a front surface 204 and a back surface 206. Both front and back surface 204, 206 include a top end 208, 210 and a bottom end 212, 214.

As shown in FIG. 3A, body portion 202 includes a slit 216 centrally positioned on the front surface 204 of garment 200. Slit 216 may extend longitudinally between top end 208 and bottom end 212 and may include a fastener, such as zipper 218. Zipper 218 is provided with respective sliders which are movable towards each other to close slit 216 and away from each other to open slit 216. Other fasteners, such as hook and loop fasteners and snaps are contemplated.

As shown in FIG. 3B, garment 200 includes an internal compartment 220 configured to retain food holder 100. An interior wall 222 may define the internal compartment 220. Interior wall 222 may be made of a material configured to contain food holder 100 without stretching or deforming, and without causing the garment 200 to pull away from the user.

Figures 3C, 3D:
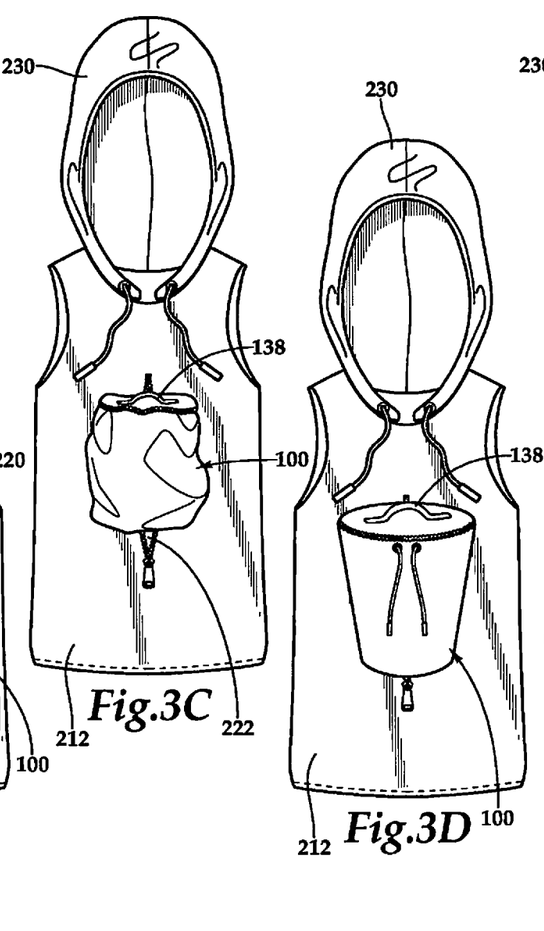
FIG. 3C illustrate removal of the food holder of FIG. 1 with lid from the garment of FIG. 3A.
FIG. 3D illustrates the food holder of FIG. 1 with lid in an expanded form when removed from the garment of FIG. 3A.

As illustrated in FIGS. 3B and 3C, and as discussed above, food holder 100 may be collapsible for positioning inside internal compartment 220. For example, food holder 100 may be collapsed into a substantially flat configuration, a substantially rectangular configuration, a substantially tubular configuration or any other suitable configuration for positioning inside internal compartment 220. In the collapsed form, the length and height of food holder 100 may range between about two inches and about five inches, and preferably the length and height may range between about three inches and four inches.

Figure 3E:
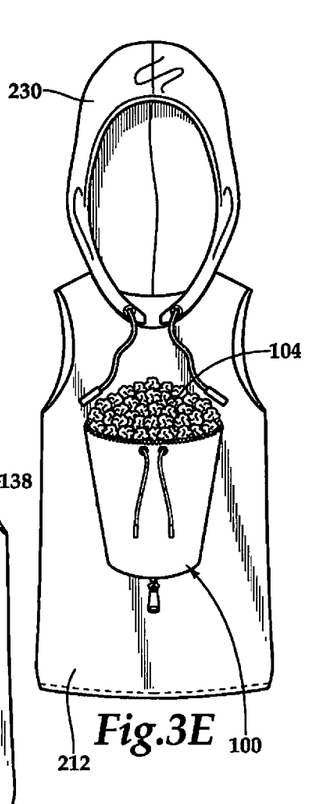
FIG. 3E illustrates the food holder of FIG. 1 holding a food container and food when removed from the garment of FIG. 3A.
Figure 3F:
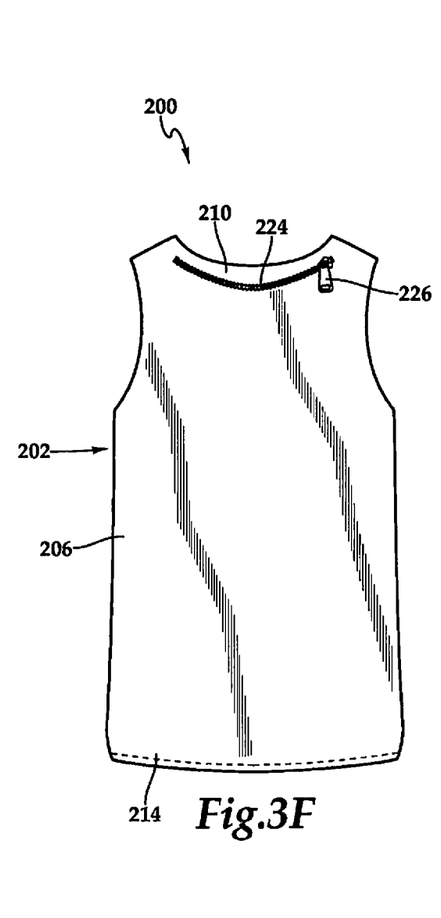
FIG. 3F illustrate a back surface of the garment of FIG. 3A for use with the food holder of FIG. 1.

As further shown in FIGS. 3D and 3E, food holder 100 further may be constructed to expand and form receptacle 102 when extracted from internal compartment 220. In addition, food holder 100 may be attached to a portion of interior wall 222 of internal compartment 220. In one example, food holder 100 may be sewn to interior wall 222 of garment 200 in a way that is not visible to the user. In another example, food holder 100 may be affixed to interior wall 222 via a detachable means, such as a hook and loop fastener, such that the user may detach food holder 100 from garment 200.

Figure 3G:
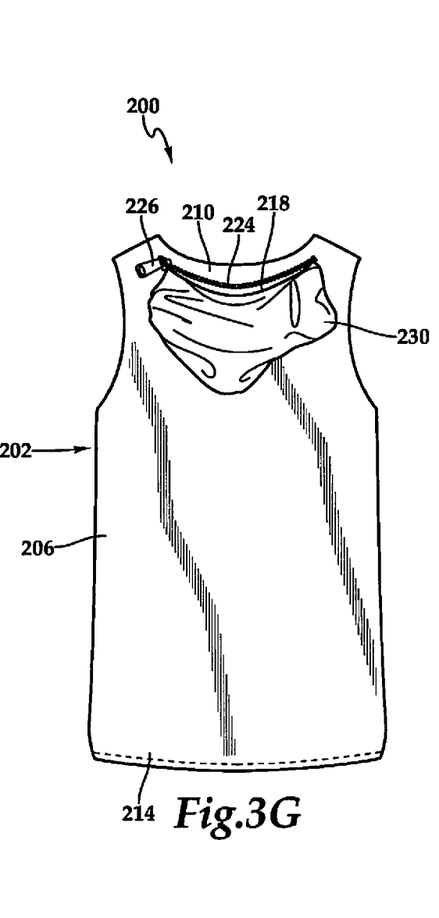
FIG. 3G illustrate removal of a hood portion from the garment of FIG. 3F.
Figure 3H:
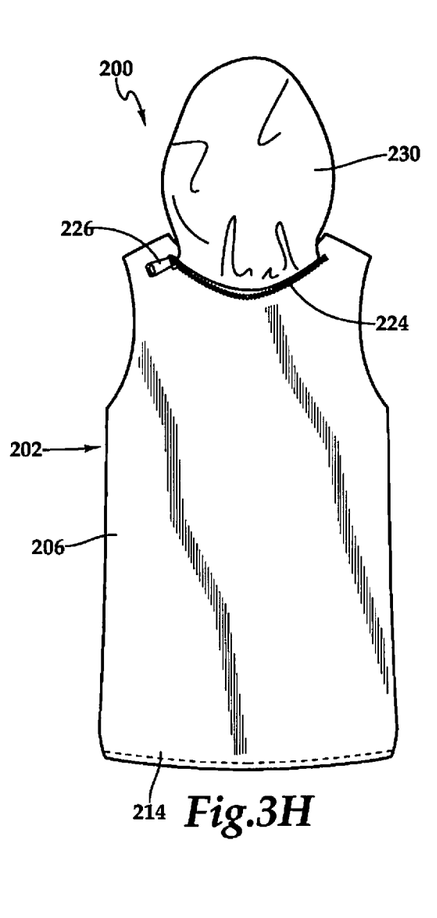
FIG. 3H illustrate the hood portion when removed from the garment of FIG. 3F.

FIGS. 3F-3H illustrate a rear view of garment 200. As shown in FIG. 3F, back surface 206 of body portion 202 may further include a transverse slit 224 that may follow the neckline of a user. Transverse slit 224 may extend across top end 210 and includes a fastener, such as zipper 226. Zipper 226 is provided with respective sliders which are movable towards each other to close transverse slit 224 and away from each other to open transverse slit 224. Other fasteners, such as hook and loop fasteners and snaps are contemplated.

As shown in FIG. 3G, a rear compartment 228 is configured to retain a hood portion 230 of garment 200. Hood portion 230 may be fixedly attached to rear compartment 228, which may be made of a material configured to contain hood portion 230 without stretching or deforming, and without causing garment 200 to pull away from the user. As illustrated in FIG. 3G, hood portion 230 may be removed from rear compartment 228 and used to cover a user's head.

FIGS. 4A-4E illustrate a hood 300, which may be hood 140 and/or hood portion 230 of garment 200, for use with a food holder 100. Hood 300 is constructed to hold a beverage container for hands free use and ease of access to contents. While hood 300 and the food holder 100 are shown as separate components, it is contemplated that each are sub-components of a single garment.

Figures 4A, 4B:
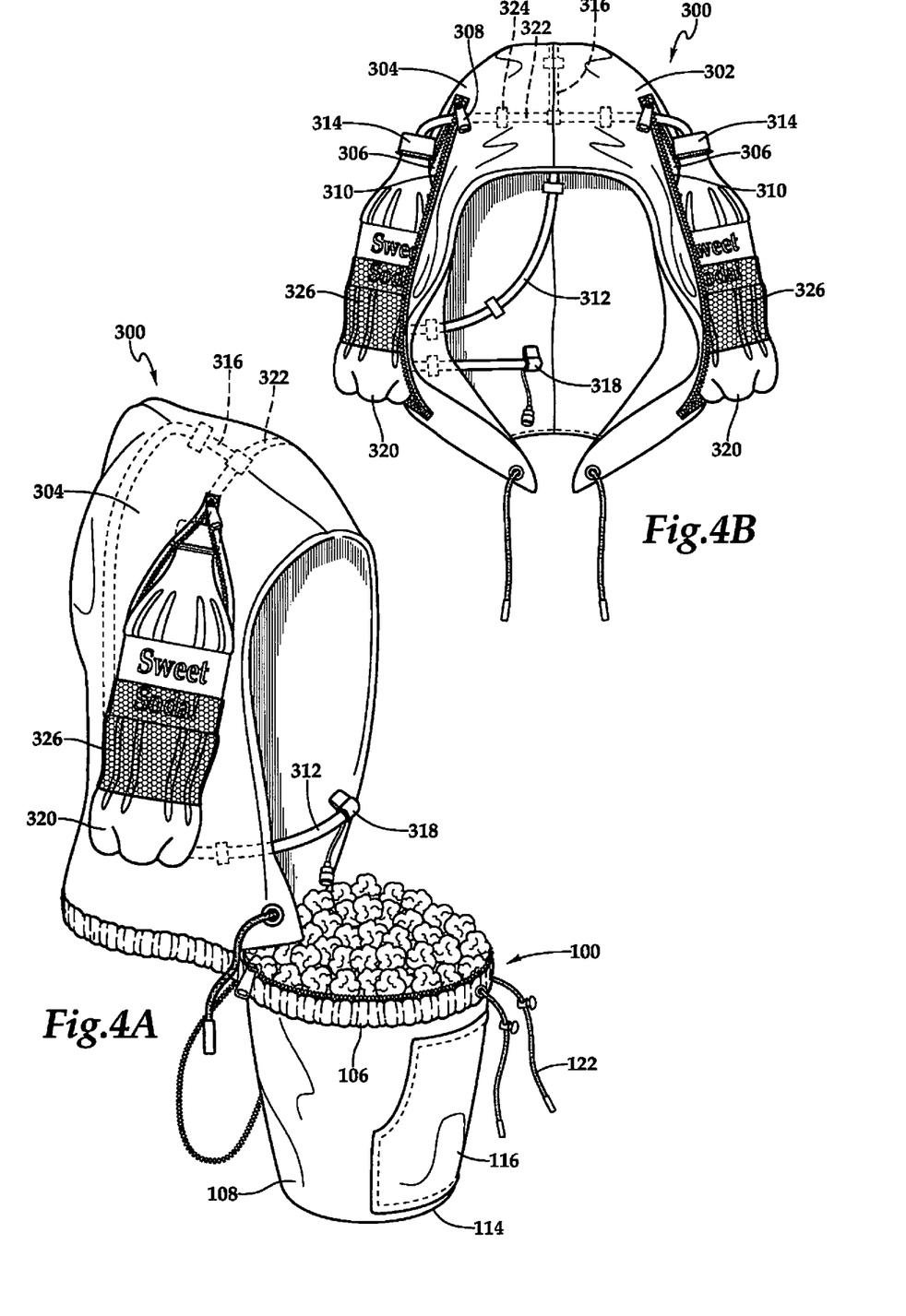
FIG. 4A illustrates a perspective view of a hood for use with the food holder of FIG. 1.
FIG. 4B illustrates a front view of the hood of FIG. 4A.
Figure 4C:
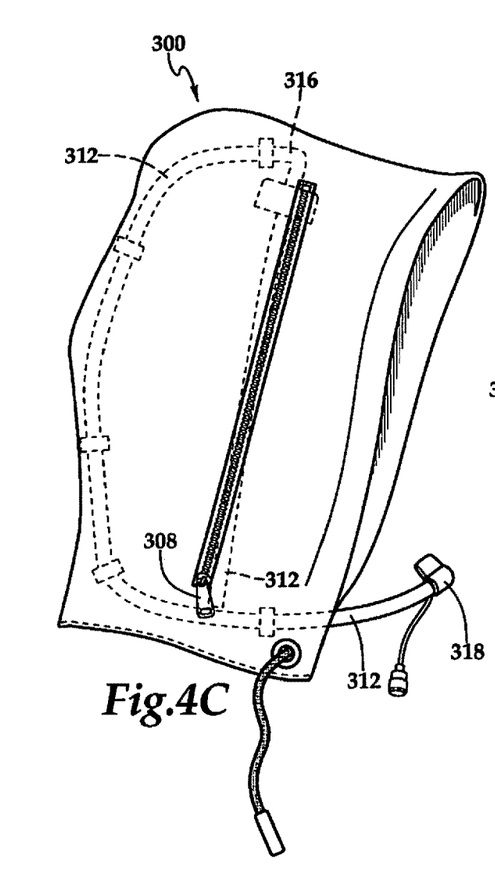
FIG. 4C illustrates a side view of the hood of FIG. 4A when the zipper is closed.
Figure 4D:
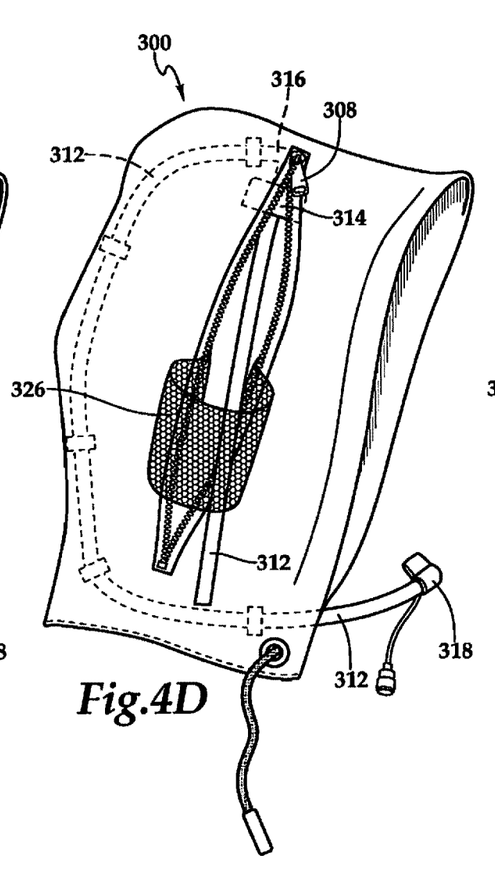
FIG. 4D illustrates a side view of the hood of FIG. 4A when the zipper is open.
Figure 4E:
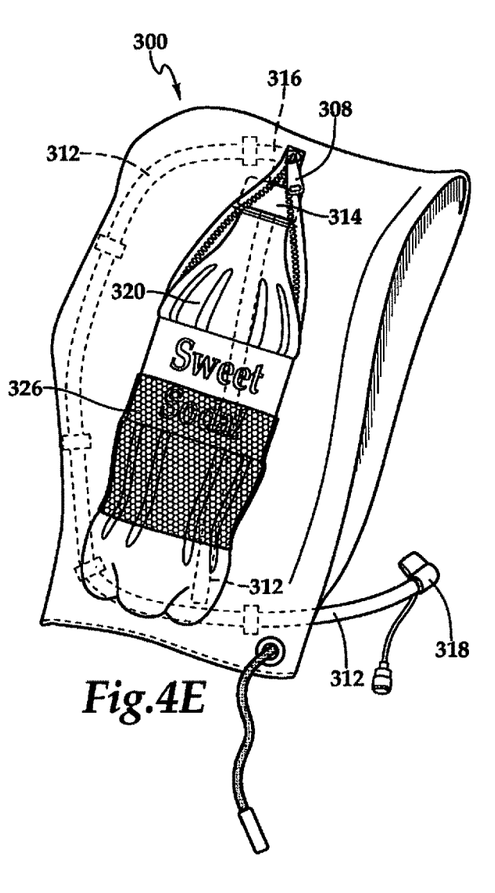
FIG. 4E illustrates a side view of the hood of FIG. 4A including a beverage container.

As shown, hood 300 may include side sections 302, 304 and an interior section 306. Side section 302, 304 may include fasteners 308 forming an opening 310 to interior section 306. Examples of contemplated fasteners include zippers, hook and loop fasteners, and snaps. FIG. 4C illustrate opening 310 in a closed position. FIG. 4D illustrates opening 310 in an open position. FIG. 4E illustrates hood 300 holding a beverage container.

Interior section 306 of hood 300 is constructed to include a beverage dispensing mechanism 312 and container holders 326. Container holder 326 may be constructed of an elastic and/or waterproof material and may be configured to wrap around the sides of a beverage container. In certain embodiments, container holder 326 may be made of an insulating material to keep the beverage at a desired temperate.

Dispensing mechanism may include an adapter 314, a liquid conduit 316, and a mouth piece 318. As shown in FIG. 4A, adapter 314 may be designed to releasably couple with a beverage container 320, such as, but not limited to a plastic water bottle. In certain embodiments, adapter 314 may include internal threads configured to engage with external thread of a beverage container such that a watertight seal may be created when screwed together.

As shown in FIG. 48, liquid conduit 316 may be constructed of flexible tubes 322 for dispensing a beverage. At one end, one or more tubes 322 may extend into beverage container 320. At the other end, one or more tubes 322 may attach to a fitting, such as a tee fitting, to coalesce during dispensing. Also, as shown, liquid conduit 316 may include one or more valves 324, which can be open during consumption of a beverage and closed to stop consumption.

In operation, when the valves 324 are open, a user may consume the beverage through mouthpiece 318. Mouthpiece 318 may include a stopper which plugs an opening. In certain embodiments, mouthpiece 318 may include a check valve that requires a small amount of suction to activate. The check valve may prevent an undesired flow of the liquid out of beverage container 320.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

Having thus described the invention, what is claimed as new and desired to be secured by Letters Patent is:

1. A sweatshirt including a hood with a receptacle, the sweatshirt configured for wearing on a user, which receptacle and hood comprise:

said receptacle having a sidewall comprising an insulative material, a top with an edge, a closed bottom and a cavity configured for receiving receptacle contents;

said receptacle including a generally circular lid with a perimeter, an upper surface and a fabric handle with a loop configuration centrally mounted on said lid upper surface;

a zipper mounted on said receptacle top edge and said lid perimeter, said zipper having a closed configuration attaching said lid perimeter to said receptacle top edge and an open configuration with said lid perimeter disconnected from said receptacle top edge, whereby said receptacle contents are exposed and accessible by a user;

said receptacle including a fabric pocket sewn onto said sidewall, said pocket having a top, a bottom and opposite sides, said pocket sides having respective upper and lower portions and said pocket forming a pocket cavity with said sidewall;

said pocket top, bottom, and side lower portions forming sewn seams with said receptacle sidewall, and said pocket side upper portions being open for access to said pocket cavity;

a fabric hood configured for selectively covering the head of a user, said hood including a front, face opening and a lower, neck opening with a neck opening perimeter;

a strap including a receptacle portion partially encircling said receptacle top edge and a hood portion partially encircling said hood neck opening;

said strap forming a channel with a pair of apertures at said strap receptacle portion;

a drawstring extending through said strap channel and extending outwardly therefrom through said apertures;

a pair of toggles each receiving a respective end of said drawstring external to a respective aperture;

said toggles having respective locked positions fixedly engaging said drawstring and unlocked positions configured for enabling said drawstring to slide through said toggles;

said hood including a pair of side pockets each forming a respective hood side pocket receptacle;

each side pocket including a zipper configured for selectively closing a respective side pocket receptacle;

each side pocket, including a container holder selectively received therein with said side pocket in a closed configuration and extending laterally therefrom with said side pocket zipper in an open configuration;

said container holders configured for holding beverage vessels adjacent said hood; and a tubular beverage dispensing mechanism mounted in said hood and including: an inlet portion configured for extending into a beverage container for extracting liquid therefrom; an outlet portion extending from said inlet portion and terminating at a dispensing mechanism end; and a stopper mounted on said dispensing mechanism end, said stopper having a closed configuration retained in said outlet portion and an open configuration disengaged from said outlet portion.

* * * * *